May 10, 1938.　　　　T. SORENSON　　　　2,117,043
RADIO RECEIVING APPARATUS
Filed Dec. 28, 1936　　　2 Sheets-Sheet 1
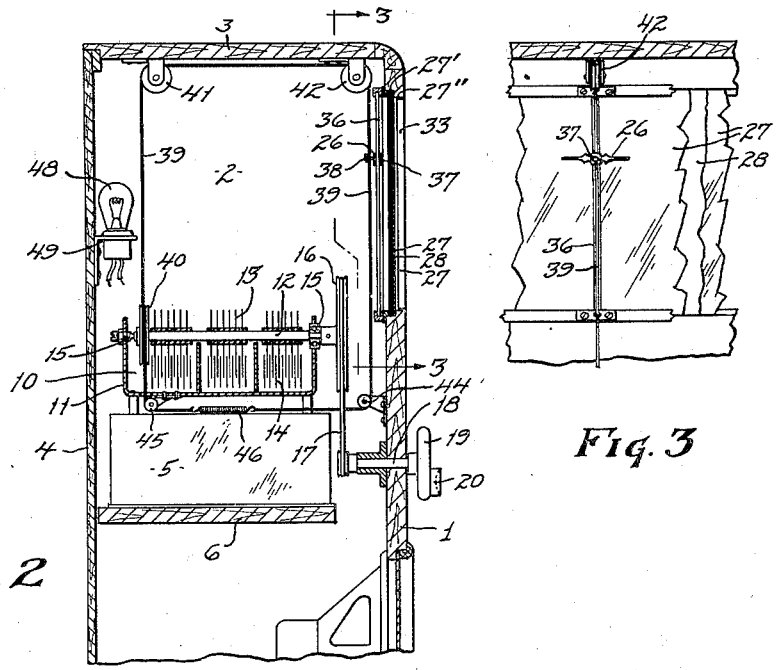
Fig. 3
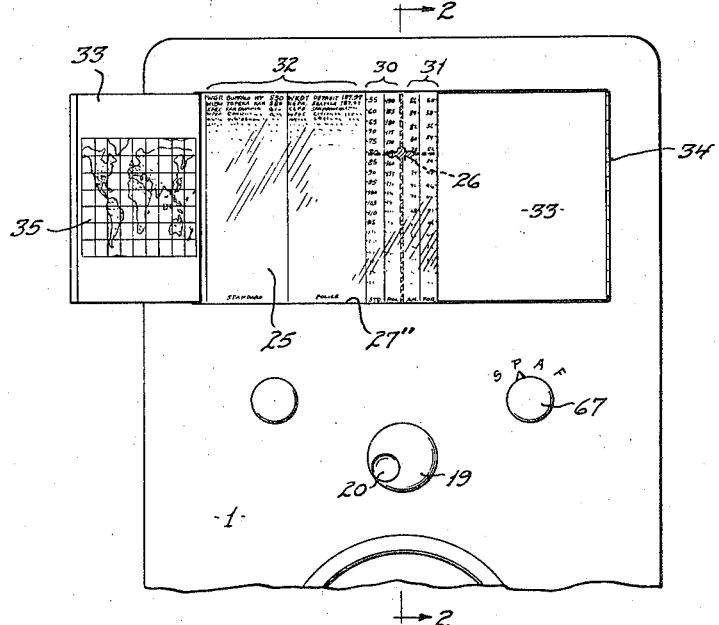
Fig. 2
Fig. 1
INVENTOR.
THOYER SORENSON
BY
Bates, Goldrick, & Teare
ATTORNEYS May 10, 1938.  T. SORENSON  2,117,043

RADIO RECEIVING APPARATUS

Filed Dec. 28, 1936  2 Sheets-Sheet 2

INVENTOR.
THOYER SORENSON
BY
Bates, Golrick, & Teare
ATTORNEYS

Patented May 10, 1938

2,117,043

UNITED STATES PATENT OFFICE 2,117,043

RADIO RECEIVING APPARATUS

Thoyer Sorenson, Cleveland, Ohio, assignor of one-half to John Y. Socotch, Cleveland, Ohio Application December 28, 1936, Serial No. 117,831

2 Claims. (Cl. 116—124.1)

This invention relates to radio receiving apparatus, and particularly to tuning means for such apparatus.

An object is to provide a radio receiving apparatus, having a dial and indicating means associated therewith, wherein the visual effect of the indicating means in any position thereof remains unchanged when viewed from various angles. Another object is to provide a tuning indicator which will not conceal from view any portion of a dial with which associated.

Further objects include the provision of a simple tuning mechanism for radio receiving sets, whereby the operative setting of a tuning member may be indicated to the user with extreme accuracy.

Still another object is to provide an improved tuning dial and index device therefor, by which a large number of stations may be located without reference to a book.

Other objects and features of the invention will become apparent from the following description, relating to the accompanying drawings, showing the preferred forms. The essential characteristics are summarized in the claims.

Figure 4:
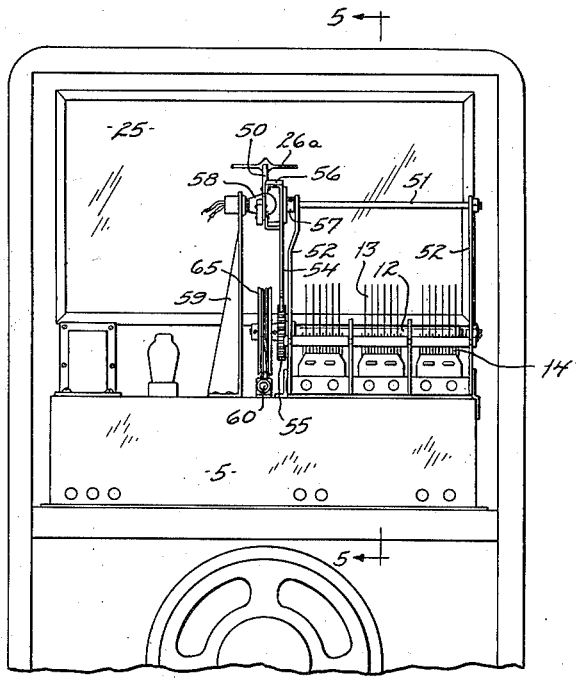
Figure 5:
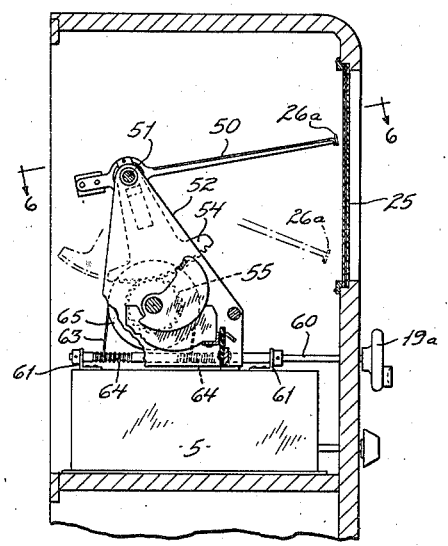
Figure 6:
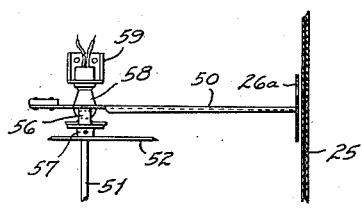

Referring generally to the drawings, Fig. 1 is a fragmentary front elevation of a radio cabinet containing an embodiment of the invention; Fig. 2 is a fragmentary vertical sectional view taken as indicated by the line 2—2 on Fig. 1; Fig. 3 is a detailed rear view of portions of the apparatus as indicated by the line 3—3 on Fig. 2; Fig. 4 is a rear elevation of a modified apparatus, including parts of the cabinet containing the same; Fig. 5 is a sectional view in a vertical plane, taken as indicated by the line 5—5 on Fig. 4, and Fig. 6 is a detailed sectional view, taken as indicated by the line 6—6 on Fig. 5.

Station selecting, in other words, "tuning", in the usual radio receiving set, is accomplished by means of a hand or pointer which is moved with reference to a properly marked dial positioned under the indicator or pointer. With such an arrangement, in order to accomplish accurate reading, the operator must view the dial from a particular angle, and he has to change his point of view to conform to various settings of the indicator, otherwise an inaccurate reading may result. Furthermore, if the pointer or indicator lies over the dial and it is necessary to provide a plurality of sets of indicating symbols on the dial, certain of these symbols or parts thereof usually become obscured or concealed by the indicator, and this interferes with quick and accurate reading. With the present arrangement, as described below, the indicating means do not overlie the dial or conceal any portion of it, and the optical effect of any given setting of the indicator remains unchanged when the dial is viewed from various angles.

Referring further to the drawings, Figs. 1 and 2 show a cabinet construction, including a front wall 1, having side and top walls 2 and 3 respectively, one side wall only being shown. The construction may include a rear wall or detachable closure panel 4. A housing containing or supporting the principal receiving instrumentalities is shown at 5 resting on a shelf device built into the cabinet.

Supported on top of the housing 5 is a tuning condenser 10, which may comprise a framework 11 on which is mounted, as in bearings 15, a rotary shaft 12, carrying appropriate sets of movable condenser plates 13. Cooperating sets of stationary plates are indicated at 14. The two sets of plates are so related that in different turned positions of the shaft 12, different respective condenser capacities are afforded for tuning.

In order to adjust the rotary part of the condenser, one end of the shaft 12, as shown, carries a pulley 16, connected as by a belt 17, with a smaller pulley on a shaft 18 supported on the front wall of the cabinet in suitable bearings. The outwardly projecting end of the shaft 18 carries a knob 19, provided with an eccentric freely swivelled finger-piece 20.

Rapid turning of the knob may be accomplished by twirling the index finger in contact with a socket effect on the finger piece. More accurate adjustment may be effected by turning the knob in the grasp of the fingers.

To indicate the operative setting of the condenser, a dial is provided at 25, on the front face of the cabinet. An indicator 26 (see Fig. 3) is associated with the dial in such manner that only the image of the indicator is visible on the face of the dial. This will later be more fully explained.

The dial may be made translucent by the provision of inner and outer transparent members 27, glass for example, suitably supported in a rearward recess 27' in the front wall of the cabinet. The two transparent panels 27 may embrace between them a substantially transparent web 28, paper for example, which bears suitable graduations and identifying symbols, preferably printed thereon.

The dial extends across the entire face of the opening 27'' provided by the frame, as shown in Fig. 1, and in addition to sets of indicia at 30 and 31, which are directly in front of the indicator 26, laterally adjacent portions 32 of the dial (one being shown), may contain supplemental information such as the names of stations, respective wave lengths and identifying symbols. The portions 32 of the dial may be concealed normally, and are rendered easily accessible by the provision of a pair of door members 33, hinged as at 34 to the extreme side portions of the face opening 27". The doors, when in closed position, nevertheless, expose the portions 30 and 31 of the dial. Additional reference data may be carried on the inside surfaces of the doors; a map 35 being shown on the open door 33, which map may have the locations and identifying symbols of various stations marked thereon.

As shown in Figs. 2 and 3, the indicator 26 is slidably mounted on a vertical guide 36, positioned behind the dial. The mounting includes a body member 37, from which indicating hands or pointers extend in opposite directions and in substantially close proximity to the back face of the dial. The body 37 has a projection 38 thereon which is suitably connected to a cord or cable 39, which in turn, is connected with the tuning member 13. As shown, the cord or cable 39 is endless, in effect, and extends around a grooved wheel 40, mounted on the shaft 12, thence upwardly over guiding sheaves or pulleys 41 and 42, carried as on the top wall of the cabinet, thence downwardly (past the connection 38, with the indicator), and around pulleys 44 and 45, back to the wheel 40. The cord may wrap once around the wheel. Slack in the cord may be taken up by a tension spring 46 connecting spaced ends of the cord.

In order to project an image of the indicator 26 onto the dial, I may provide an electric lamp 48, mounted as on a bracket 49 attached to the rear closure 4 of the cabinet. This throws shadows of both arms of the indicator onto the dial and the shadows are visible on the front face as sharply defined images. Ordinarily, the slight differences in angles of projection of the shadow of the indicator on the dial in the various positions of the indicator, are inconsiderable.

Referring now to Figs. 4 to 6, this arrangement differs from the form just described principally in that the indicator swings in an arc, rather than reciprocates. The arrangement is such that the light source always bears the same relationship to both arms of the indicator. As shown, the indicator 26a is carried on an arm 50, supported as on a shaft 51, which in turn, may be carried by brackets 52, rising from the housing 5. Appropriate means for connecting the arm to the supporting shaft 12 of the rotary condenser plates may comprise a sector gear 54, operatively rigid with the shaft 51, the sector gear meshing with a pinion 55 on the shaft 12. As shown, the arm 50 is carried on a C-shaped bracket 56, secured to a flanged head 57, on the shaft 51. The C-shaped bracket provides an open space, coaxial with the shaft 51, and in line with the arm 50, whereby the source of light 58 may be positioned in said space in balanced relationship to the pointers of the indicator and always in the same relationship to the indicator in all of its swung positions.

As shown, the light 58 (an electric lamp, as shown) is supported in said central space on a bracket 59, rising from the housing 5.

It will be noted that in the construction just described the condenser shaft 12 is mounted parallel to the dial face, and in order to connect the adjusting knob 19a therewith the knob is provided with a shaft 60, extending over the top of the housing 5 in suitable bearings 61. A flexible driving cord or cable 63 is wound at its opposite ends on suitably grooved portions 64 of the shaft 60, and the intermediate portion of the cord passes at least partially around a wheel 65, rigid with the condenser shaft 12. Preferably, the cord or cable passes more than once around the wheel 65, so that there is no likelihood of slippage in the connection between the adjusting knob and the condenser shaft, even if the cord becomes stretched.

The dial arrangement for the form of the invention shown in Figs. 4 to 6 may be the same as already described in connection with Figs. 1 to 3. It will be seen that several rows of station identifying symbols may be clearly marked on the relatively narrow portions 30 and 31 of the dial which portions are swept by the image of the indicator. The symbols or graduations may identify several types of broadcasting, for instance, standard, foreign, police and amateur (selectable by a knob such as 67, Fig. 1), all in a confined space which may be easily read and understood by persons unfamiliar with tuning, for instance small children. The selected positions of the indicator image do not change when viewed from various angles, and no portion of the face of the dial is obscured at any time by the indicator. Moreover, the operator has, readily at hand, (by opening one or both of the doors 33) explanatory reference data relating to the dial symbols, which data are ordinarily kept in a book or chart such as may easily become mislaid.

I claim:

1. In radio-receiving apparatus, the combination of a vertically elongated translucent dial, an indicator pivotally mounted to swing vertically behind the dial, and a light source arranged to project a shadow of the indicator on the dial, such light source being located substantially at the pivot axis of the indicator.

2. In radio-receiving apparatus, the combination of a cabinet having an elongated vertically disposed opening in one wall thereof, a translucent dial mounted within said opening and having vertically disposed rows of symbols visible on its outer face, tuning means including a rotary shaft, an indicator pivotally mounted to swing vertically within the cabinet and behind said dial, gearing connecting the shaft with the indicator, and a source of light substantially at the pivot axis of the indicator to project a shadow of the indicator upon the outer face of the dial in a manner to indicate selectively the rows of symbols in accordance with the relative movement of said tuning means.

THOYER SORENSON.